March 30, 1943.  J. G. HEASLET  2,315,421

CRAWLER TRACTOR SIDE FRAME CONSTRUCTION

Filed Feb. 5, 1941  2 Sheets-Sheet 1

INVENTOR
James G. Heaslet
BY George Douglas Jones
ATTORNEY

March 30, 1943.　　　J. G. HEASLET　　　2,315,421
CRAWLER TRACTOR SIDE FRAME CONSTRUCTION
Filed Feb. 5, 1941　　　2 Sheets-Sheet 2
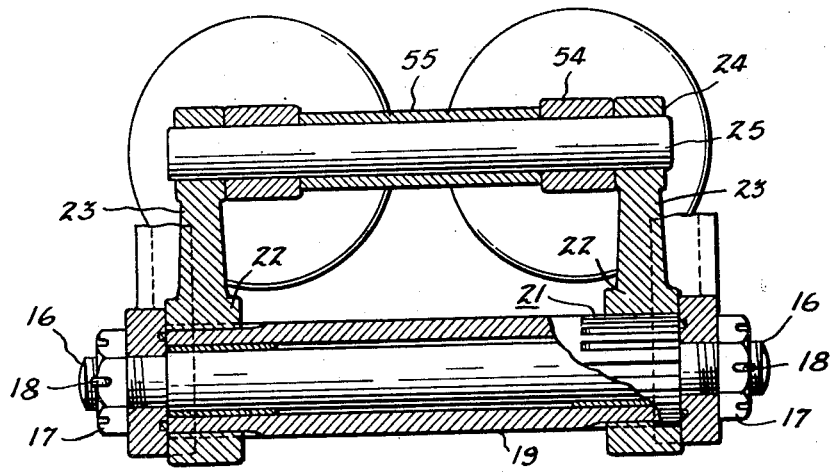
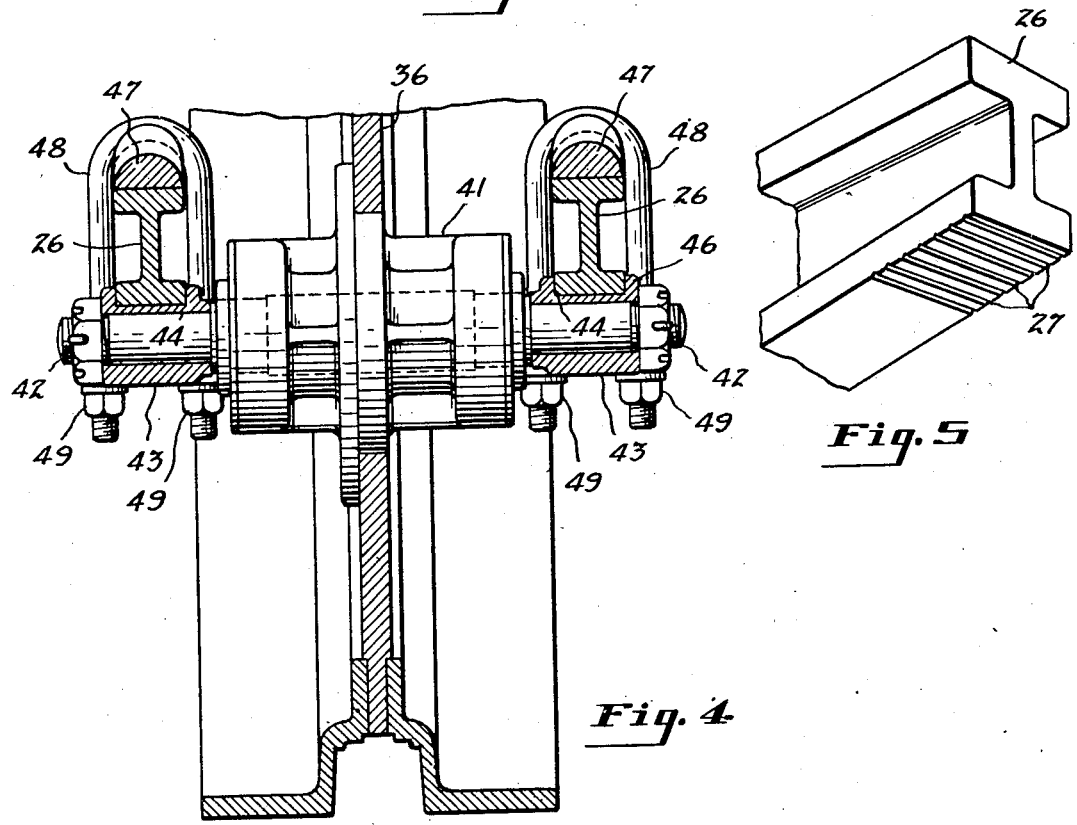
INVENTOR
James G. Heaslet
BY George Douglas Jones
ATTORNEY Patented Mar. 30, 1943

2,315,421

UNITED STATES PATENT OFFICE 2,315,421

CRAWLER TRACTOR SIDE FRAME CONSTRUCTION

James G. Heaslet, Hudson, Ohio, assignor to The Cleveland Tractor Company, Cleveland, Ohio Application February 5, 1941, Serial No. 377,559

4 Claims. (Cl. 305—9)

This invention relates to crawler tractors and more especially the side frame construction which embodies the idler wheel and adjusting means therefor.

Side frames of crawler tractors comprises a side frame structure and associated therewith are drive sprockets. Supporting track wheels and idler wheels are journaled to the side frame, and an endless belt or track encircles the entire side frame mechanism.

With this type of construction the entire side frame, track wheels and idler wheels form a rigid structure in relation to each other. Therefore various designs of interposed resilient means and shock absorbing mechanisms have been designed and used to dampen the transfer of shock from the track and side frames to the body of the tractor.

It is now acknowledged by those skilled in the art that rapid wear, and frequently distortion of the idler wheel and its associated mechanism is due primarily to the severe shocks encountered in operation, and to the rigid structure comprising the side frame.

In the past some development was made in which the track wheels were supported through resilient mechanism and other development provided for a sectional side frame structure, the sections being hinged or pivoted with resilient means interposed to dampen the shock and return the side frame members to normal position. These designs and many more have been abandoned in favor of the rigid side frame and track mechanism thereon, due mainly to multiplicity of moving parts, which are difficult to hold in alignment and costly to construct.

The present invention resides primarily in a development of idler wheel mechanism support that is new and novel and after extensive and costly experimentation and development, the structure has proved highly successful both in the function of operation, reducing shocks, and wear to a minimum, plus the fact that the riding qualities of the tractor are unbelievably improved, in fact to the point of providing greatly increased safe speeds of the tractor, such speeds that have not been attainable in the past.

An important object of the present invention is to provide an idler wheel supporting member, hinged or pivoted to the side frame of a crawler tractor and provided with resilient means to normally press the idler wheel in a downward arc and adjustable bearing means for the idler wheel.

Another object of the present invention is to provide an improved idler wheel supporting mechanism pivoted to the side frame of a crawler tractor and provided with resilient pressure means normally tending to maintain the idler wheel in ground contact and dampener means to prevent hammering action on the idler wheel and its mechanism when traveling over rough terrain.

A further object of the present invention is to provide an improved crawler tractor idler wheel mounting so arranged that the idler wheel will move in a vertical plane and maintaining at all times resilient supporting means of the track frame throughout the entire movement of the idler wheel.

Other objects of the invention will appear from the following description taken in connection with the drawings which form a part of this specification, and in which Fig. 1 is a side elevational view of the idler wheel and mechanism associated with the side frame.

Fig. 3 is a front sectional view of the idler wheel pivot bracket taken on line 3—3 of Fig. 1.

Fig. 4 is a front fragmental sectional view of the idler wheel and supporting means taken on line 4—4 of Fig. 1.

Fig. 5 is a fragmental perspective view of one idler wheel supporting arm.

Figure 1:
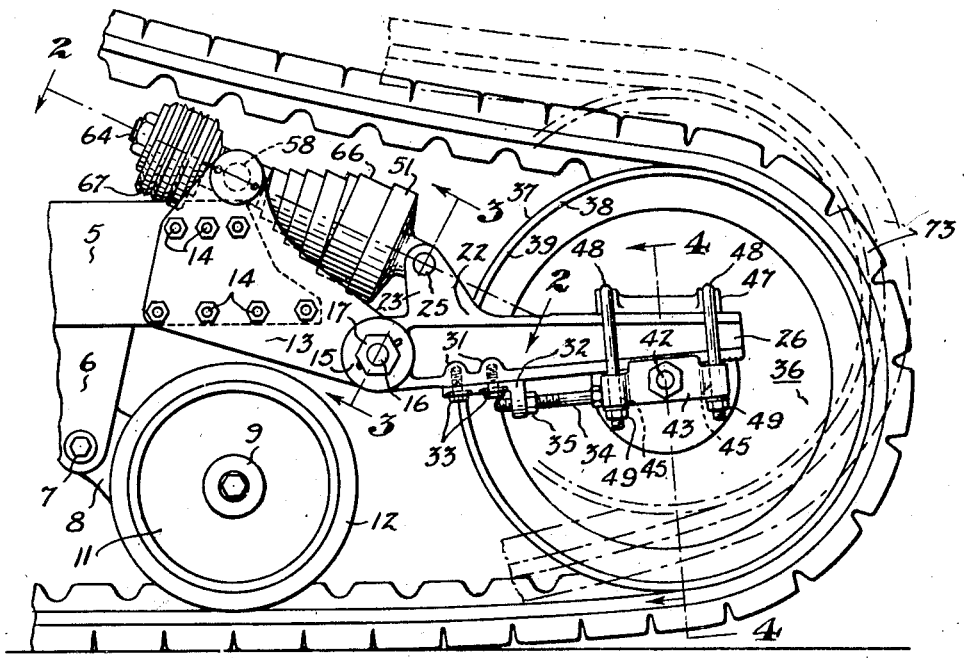
Figure 2:
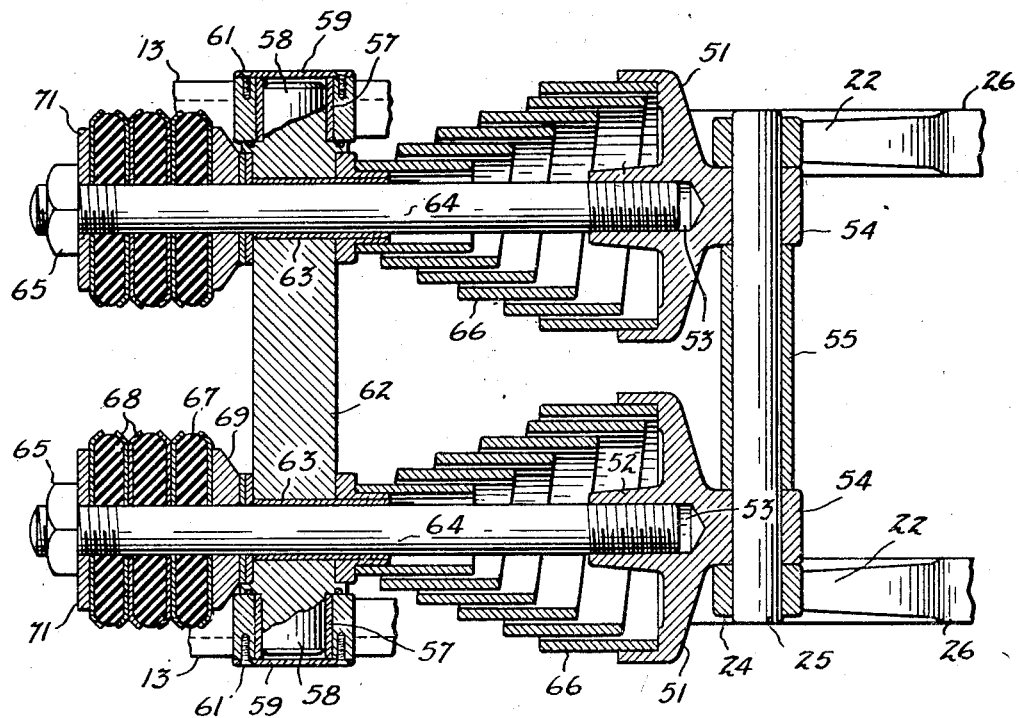
Fig. 2 is a top plan view of the idler wheel pivoted bracket and resilient means therefor.

Referring now to the drawings by numerals and reference, wherein like numerals correspond to like parts, the reference numeral 5 is a portion of the side frame of a tractor, a depending bogy wheel supporting arm 6 is rigidly secured to the side frame, preferably by a welding operation, a pivot member 7 is positioned adjacent the lower portion of the depending supporting arm; pivoted to the member 7 is a bogy wheel axle bracket 8 to which is mounted a bogy wheel axle bearing (not shown) and journaled to axle 9 on which is carried a bogy wheel 11. The wheel as shown is preferably equipped with a rubber tire 12. However, a solid steel tire may be used.

A pair of longitudinally depending plates 13 are secured to each side 5 of the side frame and project beyond the same. The plates may be bolted to the side frames as shown with bolts 14. The said plates may be welded to the side frame if preferred.

Positioned adjacent the forward end of the depending plates 13 are apertured portions 15 in which are carried an elongated bearing 16, the bearing is provided with threaded ends and secured in position by castellated nuts 17 which may be restricted from turning by cotter keys 18.

Journaled on the bearing is tubing 19 provided with splined ends 21 to which are secured bell crank members 22. It should be noted that the tubing and bell crank members are positioned on the inside of the depending plates and abut the same. The upstanding legs 23 of the bell crank 22 are provided with apertures 24 into which a bearing member 25 is positioned. The horizontal legs 26 are tapered outwardly in the vertical plane and are formed preferably in an I beam cross section. Located near the outer end of each horizontal leg, and preferably on the underside, are a plurality of spaced apart parallel indentations 27 as illustrated in Fig. 5. The said indentations are placed transversely of the horizontal leg and are used as an indicator when adjusting the idler wheel.

Towards the pivot point or bearing 16 of the horizontal leg, and on the underside thereof, spaced apart tapped holes 31 are provided.

An L shaped idler adjusting block 32 having spaced apart holes in one leg, abuts the underside of the tapered legs, the holes registering with the tapped holes in the said horizontal leg. Cap screws 33 secure the member to the said legs 26. The vertical leg of the L block 32 is provided with a tapped hole into which is screwed an idler adjusting bolt 34 and is provided with a lock nut 35.

Idler wheel bearings and supports

The idler wheel may be of any desired design, such as a drum disc 36 and a centrally located indented portion 37, upstanding walls 38 and a tire flange 39 on which the rails of the track or belt are carried.

A hub portion 41 carries the disc 36 and is secured thereto by welding or riveting as desired. Within the hub portion are bearings (not shown) preferably of the antifriction type and journaled on an axle 42, the axle being positioned in an axle boxing 43, the upper or top portion of the boxing being channel shaped as shown at 44, in Fig. 4. It will be noted that the channel portion fits into the underside of the tapered legs 26, thereby providing a groove portion slidable on the leg. The axle boxing is provided with spaced apart holes 45 and positioned on each side of the said boxing. A U bolt holder 46 is carried on the upper side of the tapered legs having grooved portions 47 into which U bolts 48 are carried. The said bolts are placed through the holes 45 of the axle boxing 43, thus clamping the idler wheel bearing boxing to the horizontal tapered legs 26 by means of nuts 49. It should be noted that the head of the adjusting bolt 34 abuts the axle boxing 43. It should be further noted that the said adjusting bolt is an extremely efficient means of adjusting the longitudinal movement of the idler wheel. This is accomplished by loosening the nuts 49 and screwing the adjusting bolts either forward or rearward as desired, and as the movement occurs the forward or front side of the axle boxing 43 passes the marks 27 on the tapered shafts 26, thus providing means of keeping the idler wheel in alignment when adjusting the same. It should be also noted that the purpose of tapering the legs 26 is to aid in positively securing the idler wheel and axles in the desired position in relation to the tracks and in maintaining alignment thereof, as the pressure on the idler wheel is always in a direction toward the side frame, and thus any movement in this direction tends to wedge the axle holding means.

Resilient pressure actuating mechanism

The action of resilient pressure means on the idler wheel of a crawler tractor forms an important part of this invention and therefore will be discussed in detail.

Annular cup shaped resilient holders 51 are provided with a centrally located boss 52 having a threaded hole 53 positioned centrally of the boss. Bearing portions 54 are journaled on the axle 25 and maintained in spaced apart relation by means of spacer bar 55 which is positioned on the axle.

Located on the upper portion of the depending plates 13 are bearings 57 and journaled to the bearing is an axle 58. End plates 59 are secured in place by screws 61, thus preventing lateral movement of the axle.

A tubular housing 62 is journaled on the axle 58 and having spaced apart transverse annular bearings 63 rigidly secured thereto. Resilient holder rods 64 are provided with threaded ends, one of which is screwed into the threads 53 in the boss 52, the opposite ends of the rods having a nut 65 positioned thereon.

One end of a spring 66 is positioned within the cup 51 and the opposite end, enclosing a portion of the bearing 63. On the opposite side of the bearing 63 and encasing that portion of the rods 64 projecting beyond the said bearing, are a plurality of resilient pads 67 which preferably have metal covering cups 68 thereon, and a base member 69, the lower portion of which abuts the tubular housing adjacent the bearings 63. A washer 71 may be placed between the top resilient pad and the nut 65 to prevent cutting or rapid wear due to the movement of the rods 64.

The action of the present invention resides in the pivoted idler supporting bell crank, wherein one leg of the said bell crank carries the idler wheel, and the other or upstanding leg is associated with a resilient means, preferably a spring member which is precompressed by means of the adjusting nut 65. With this adjustment any predetermined or desired pressure may be applied to the idler wheel. The bell crank action of the unit taken in connection with the resilient pressure means normally forces or presses the idler wheel downward, but permitting it to move upwardly when traveling over uneven surfaces as indicated in Fig. 1, the positions assumed by the track 73 which encircles the idler wheel and supporting mechanism being indicated by dotted lines.

Thus the severe shocks encountered when traveling over rough and rigid ground surfaces are absorbed by the resilient mechanism of the idler.

From actual operation it appears to make little or no difference as to the location of the idler, i. e. whether in the front or rear of the side frame.

When it is desired, due to the design of the tractor, to place the idler wheel at the rear, the periphery of the drive sprocket wheel should be positioned at some distance above the ground line. This is also preferred when the drive sprocket is at the rear of the side frame and the idler is located on the front of the side frame. In a design of this type, with the drive sprocket off the ground line and the idler wheel pivoted as herebefore described, a working action will take place instead of a severe shock when meeting an obstruction.

It should be apparent to those skilled in the art that a crawler tractor incorporating this design may be safely driven at high speeds without breakage and distortion as is the case with the present design of crawler tractors when increased speed is desired.

The speeds of the present invention may safely be placed at fifty miles per hour as against the conventional present day crawler tractor of five miles an hour.

It will be understood that various forms of the invention other than those described above may be used without departing from the spirit or scope of the invention.

What I claim is:

1. In a crawler tractor of the type having side frames and idler wheels associated therewith and tractor supporting track wheels carried by the track frame, an endless track encircling said wheels, the combination therewith of a pivoted yoke including a pair of spaced apart longitudinally extended tapered arms on whose tapered surfaces are mounted an adjustable bearing mounting for each idler wheel and a pair of upstanding bearing arms secured adjacent the base of the tapered arms and provided with resilient means pivoted to the upstanding bearing arms and associated with the track frame to normally hold the idler wheel in a predetermined position relative to ground.

2. In an idler wheel supporting mechanism for crawler tractors including a pair of spaced, parallel, longitudinally extended tapered arms pivotedly mounted to the forward portion of the side frame of a crawler tractor, slidable adjustable idler wheel bearing mountings associated with the tapered surface of said arms and adjustable resilient means comprising convolute springs pivotally supported to the side frame of the tractor and the said tapered arms actuating the tapered arms to normally hold the idler wheel in a predetermined position and to retard upward movement of the idler wheel, thereby providing a stabilizing of the said idler wheel.

3. In a crawler tractor of the type having side frames and idler wheels, an endless track encircling the said wheels, the combination therewith of an idler adjusting means comprising a pair of longitudinally extended tapered arms pivotedly associated with the side frame, a slidable idler wheel bearing support carried by the said tapered arms and adjustable securing means therefor, upwardly extending arms integrally formed with and located adjacent the pivot of the tapered arms, resilient means intermediate the upwardly extending arms and the side frame whereby a normal downward pressure is maintained on said idler wheel.

4. In a crawler tractor of the type having side frames and idler wheels, and an endless track encircling the said wheels, the combination therewith and with each of the idler wheels of a pivoted idler wheel carrying member provided with an upstanding arm, a slidable rod pivoted to the upstanding arm and slidably associated with a bearing mounted on the side frame, yielding means intermediate the bearing and the upstanding arm and a resilient means intermediate the bearing and the end of the rod, adjustable holding means on the end of the rod, the said adjusting means providing mechanism to place the idler wheel in a predetermined location relative to the ground.

JAMES G. HEASLET.